June 3, 1947.  C. R. WASEIGE  2,421,398
PRODUCTION OF COMPRESSED AIR ON BOARD AIRCRAFT
Filed May 21, 1942  2 Sheets-Sheet 2
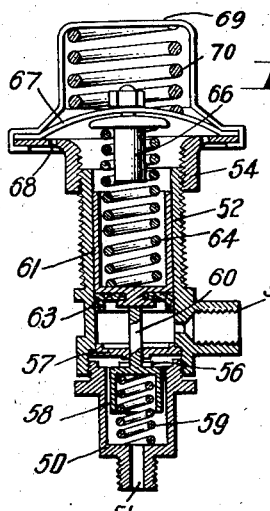
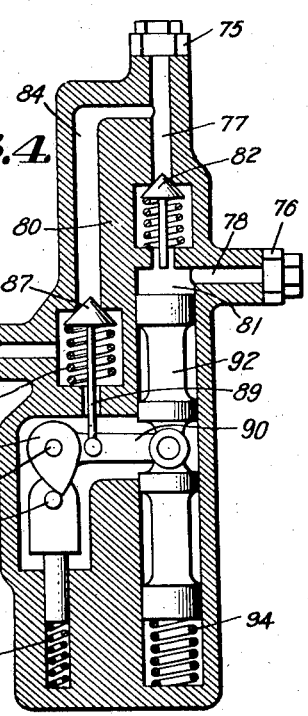
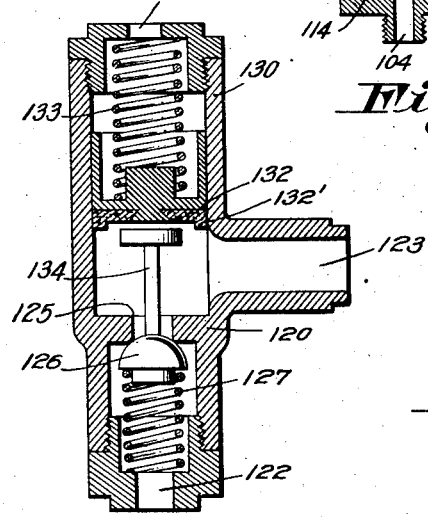
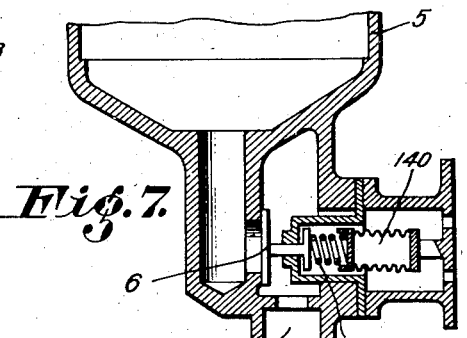
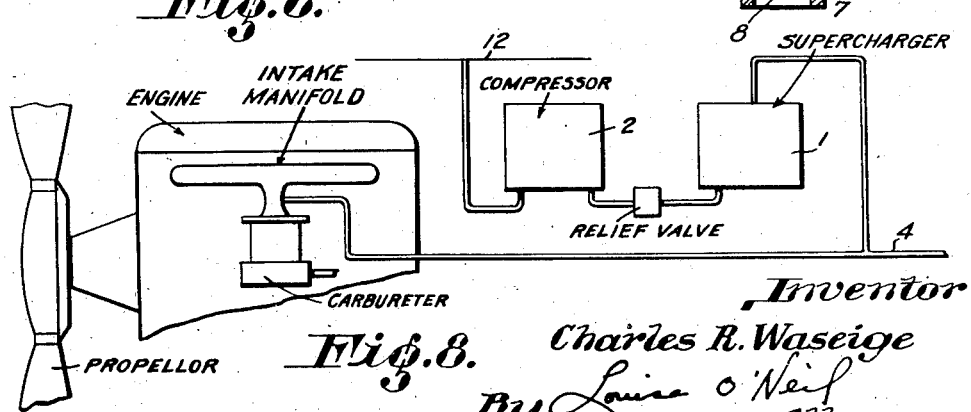
Inventor
Charles R. Waseige
By Louise O'Neil
Attorney Patented June 3, 1947

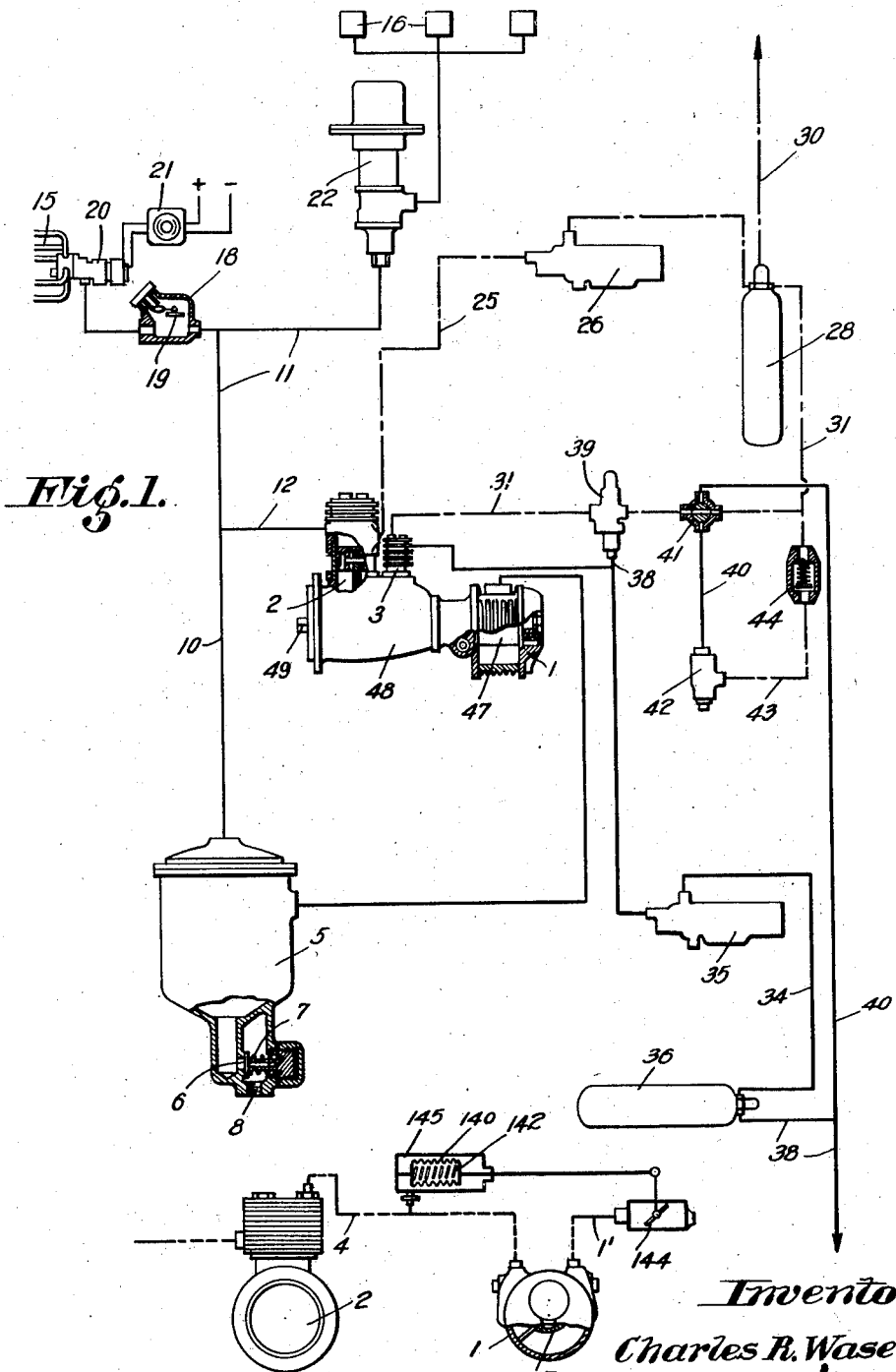

2,421,398

UNITED STATES PATENT OFFICE 2,421,398

PRODUCTION OF COMPRESSED AIR ON BOARD AIRCRAFT

Charles Raymond Waseige, Rueil, France; vested in the Attorney General of the United States Application May 21, 1942, Serial No. 443,966 In France December 24, 1940

13 Claims. (Cl. 230—45)

My invention relates to improvements in devices for producing compressed air for the operation of apparatus on board aircraft.

As is well known, it is necessary for the operation of apparatus on board aircraft that air be supplied at widely different pressures, for both discontinuous and continuous use, and that differences in atmospheric pressure and in air density at different altitudes above the earth must be taken into account. Air pressure producing devices heretofore used for the purpose have been cumbersome, difficult to cool, and required an excessive amount of power for their operation, as in the case where a single pressure tank having a number of pressure relief devices has been used to supply compressed air at the widely differing pressures required by a similar number of pieces of apparatus.

The primary object of the present invention is to provide a device of the character indicated which reduces or eliminates the above mentioned difficulties and others, by employing at least two air compressors, one of which intakes atmospheric air and feeds the other compressor at a substantially constant absolute pressure, determined by the operation of valving means in the air circuit of the first mentioned compressor, responsive to the altitude of the aircraft.

Because of the controlled supercharging of the second compressor thus provided, the device can supply air at the required pressure regardless of the altitude of the aircraft. The valving means is preferably arranged in the output side of the air circuit of the first compressor so that the first compressor feeds both the second compressor and that part of the device to which this pressure is suited. The valving means can also be arranged in the suction side of the air circuit of the first compressor so as to more or less throttle the air intake of the first compressor. The adjustment of the valving means is preferably controlled by a suitable form of manometric capsule or cartridge.

In a preferred embodiment of the invention the device comprises a third compressor arranged to deliver air at a higher pressure than that delivered by the second compressor, with the pressure side of said second compressor feeding both the third compressor and that part of the device to which the second generator's pressure is suited. In this case the three compressors are referred to herein as the "low pressure," "medium pressure," and "high pressure" compressors or generators.

These compressors may be of any suitable types. The low pressure compressor may advantageously be either a pump of the volumetric type or may consist of a supercharger of one of the aircraft engines arranged in advance of the engine carbureter.

The several air compressors are preferably aligned and arranged as a self-contained assembly driven by a single shaft.

It is known that heretofore the suction of the low pressure pump has been used for revolving the rotors of gyroscopic instruments on board aircraft, the necessary vacuum for the purpose being about 200 grams. Bearing in mind that at an altitude of 10,000 meters the atmospheric pressure is only about 260 grams, it will be understood that even when using a pump capable of producing an almost absolute vacuum, it is not possible to assure proper operation of such gyroscopic instruments above a certain altitude. However, in accordance with the present invention, these difficulties are eliminated by operating these instruments with pressure from the output side of the low pressure compressor through a pressure relief means.

The present invention consists also in certain accessories particularly adapted to my novel compressed air supplying device, notably an automatic cock or valve, pressure limiting valves, and the like, so devised as to be combinable with a manometric capsule or cartridge, which can either empty or fill with air at ground atmospheric pressure so that the adjustment of the valves varies in accordance with the altitude of the aircraft.

Other objects and features of the invention will appear from the following description and the accompanying drawings wherein exemplary embodiments of the invention are set forth.

In the drawings:

Figure 1 is a diagrammatic view of a device or installation in accordance with the present invention;

Figure 2 is a similar but fragmentary view of a modification thereof;

Figures 3 to 6 are vertical sectional views on a larger scale of several components of the embodiment shown in Figure 1, comprising the regulating valve of Figure 3, the regulator of Figure 4, the automatic cock or valve of Figure 5, and the pressure relief device of Figure 6;

Figure 7 is a fragmentary vertical section taken through a modification of the valve for limiting the "low pressure" delivery pressure; and Figure 8 is a diagrammatic representation of an arrangement according to the invention in which the aircraft engine carburetor supercharger is utilized to feed the low pressure air compressor of the device.

The embodiment of the invention shown in Figure 1 of the drawings, comprises three air compressors, namely, a low pressure compressor 1, a medium compressor 2, and a high pressure compressor 3.

The low pressure compressor 1 intakes free atmospheric air and has its output pipe 4 connected to a purifier or scrubber 5 of any suitable type capable of removing the oil or water particles carried by the air.

The purifier or scrubber 5 is provided at its lower end with a pressure regulating valve 6 pressed by a spring 7 against its seat. This valve establishes communication between the inner chamber of the purifier and the outside atmosphere through an opening 8 when the pressure in said chamber exceeds a pressure predetermined by the tension of the spring 7.

The compresesd air leaves the purifier 6 through a pipe 10 which divides into a branch pipe 11 which feeds servo-devices, and a branch pipe 12 which feeds the medium pressure compressor 2. It is assumed in this case that there are two of such servo devices fed by low pressure, namely, the piping 15 of the de-icing device and the gyroscopes associated with the steering instruments 16. The piping of the de-icing device is fed through a valve 18 comprising a chamber enclosing a closing shutter 19 rockably mounted on a pivot and controlled by suitable means (not shown) so as to close and open without causing any braking effect upon the flow of air therethrough. An electric distributor 20, energized through a rheostat 21, distributes through the pipes 15 the air which must reach the several pneumatic chambers arranged on the leading edges of the wings of the aircraft, the pulsating of which chambers produces the de-icing effect. The air is supplied to the gyroscopes associated with the steering gear 16 through a pressure regulating valve 22. One illustrative form of such a valve is shown in Figure 3 of the drawings and is hereinafter described.

The medium pressure compressor 2, which is fed by the low pressure generator through the pipe 12, is of usual type and discharges through a pipe 25 (shown in dotted lines), and preferably through a regulator 26, into a reservoir 28. The regulator 26, a preferred form of which is hereinafter described and is shown in Figure 4, provides communication with the outside atmosphere for the delivery pipe 25 whenever the air pressure in the reservoir 28 exceeds a predetermined limit. The compressed air in the reservoir 28 supplies the servo devices through the pipe 30 at the medium pressure required for, for example, the operation of the aircraft's brakes, automatic weapons, etc., while the pipe 31 conveys the excess air to the intake of the high pressure compressor 3.

The high pressure compressor 3, thus supplied with air under medium pressure, forces the air under higher pressure through a pipe 34, and preferably through a regulator 35, into a reservoir 36. The regulator 35 is of a type similar to the regulator 26 and establishes communication between the delivery side of the high pressure compressor 3 and the outside atmosphere whenever the pressure in the reservoir 36 exceeds a predetermined limit. The pipe 34 can be advantageously connected through a pipe 38 to a distributor 39 connected in the pipe 31. A preferred form of distributor 39, shown in Figure 5 and hereinafter described, is so arranged as to shut off the upside part of the pipe 31 and to establish communication with the outside atmosphere of the inlet side of the compressor 3 when its output side is opened to the atmosphere by the action of the regulator 35. The circuit is restored to normal whenever the pressure is restored at the delivery pipe 34. Any excessive output of the medium pressure compressor 2 is thereby avoided when the high pressure compressor is inoperative.

The air under the highest stage of compression leaves the reservoir 36 through a pipe 38 which supplies the servo-motor operated devices of the aircraft requiring high pressure actuation.

In Figure 1 is shown a means of using the reserve of high pressure air contained in the reservoir 36 for supplying those servo-motor operated devices which require only medium pressure for their actuation. For this purpose, a branch pipe 40 connected to the pipe 38 leads through a shut-off valve 41, connected in the pipe 31 between the distributor 39 and the reservoir 28, to a pressure reducing or relief valve 42. The shut-off valve 41 is manually controlled, its two alternative positions corresponding to interruptions of air flow through the pipes 31 and 40, respectively. The pressure reducing valve 42, shown in Figure 6 and hereinafter described, supplies medium pressure air to a pipe 43 in which is connected a one-way valve 44 of conventional form, permitting the air to flow in only one direction. The pipe 43 is connected to the pipe 31 at a point between the shut-off valve 41 and the reservoir 28, whereby it can be fed by medium pressure compressed air from the high pressure reserve contained in the reservoir 36. Undesired by-passing of the air in the circuit is prevented by the shut-off valve 41.

The low pressure compressor 1, which can be constituted by the compressor used for super-charging the aircraft engine, and be branched off from the intake side of the carburetor, is here shown as comprising a vacuum pump of the volumetric type essentially constituted, as illustrated in Figure 2, of a body or casing and an eccentric rotor enclosed therein and fitted with vanes or blades.

The medium and high pressure compressors 2 and 3, which may be of the centrifugal type, are shown as including pistons and cylinders mounted on a common casting 48, to which the cylinder of the low pressure compressor is secured. The three compressors 1, 2 and 3 are aligned and driven by a common actuating shaft 49, so as to form a self-contained assembly.

As illustrated in Figure 3, the regulating valve 22 comprises a body made up of three parts. The part 50 carries the air inlet union 51, while the second part 52 is screwed upon the part 50 and comprises substantially a cylindrical tube fitted at its upper end with the air outlet union 53, the third part 54 being screwed upon the part 52, forming a cap fitted upon its upper end.

The part 50 of the regulating valve 22 forms the housing of a disk valve 56, whose seat 57 is situated above it and underneath the union 53. The valve 56 is carried by a sleeve 58 which is urged upwardly by a spring 59. A rod 60, connected to the sleeve 58, is urged by the spring 59 into contact with a projection on a sleeve 61 which is slidably fitted in the tube 52. The lower end of the sleeve 61 is provided with a gasket 63 tightly applied against the inner wall of the tube 52. A spring 64, accommodated in the sleeve 61, urges the sleeve 61 in a direction corresponding to that in which the valve 56 opens and is abutted, through the medium of a head member 66, with a membrane 67 carried by the flange-shaped third part 54 of the valve 22, holes 68 being formed in the said part 54. The membrane 67 is of distortable character and forms one of the walls of a sealed vacuum chamber 69 containing a spring 70 which urges the membrane downwardly, that is to say, in such a direction as to compress the spring 64. As will be understood, the pressure of the air flowing past the valve 56 presses on the gasket 63, whereby when the air pressure upon the gasket at one side exceeds the atmospheric pressure on its other side plus the resistance of the spring 64, the sleeve 61 is lifted and closes the valve 56.

Reopening of this valve takes place by the action of the spring 64 whenever the air pressure in the union 53 subsides.

The membrane 67 is distorted by the spring 70 thereby increasing the tension of the spring 64 when the outside atmospheric pressure diminishes, as when the aircraft reaches altitude above the earth, so that the force exerted on the sleeve 61 and consequently the limit pressure of the air inside of the union 53 are independent of the altitude or vary in terms of the altitude according to a determined law. Supply of air through the regulating valve 22 to the servomotor operated devices is thereby assured under most suitable conditions.

In Figure 4 is shown a preferred form for the regulators 26 and/or 36, which may be generally conventional, and adapted to be traversed by the compressed air flowing between the unions 75 and 76 having extensions in the form of ducts 77 and 78 formed in the body 80 and leading to a chamber 81. A shut-off valve 82 is provided at a point between the union 75 and the chamber 81. A duct 84 connected to the duct 77 at the upside of the valve 82 leads to a union 85 which is in free communication with the outside atmosphere. A needle valve 87 housed in the duct 84 is downwardly urged toward its seat by a spring 88. The needle valve 87 is connected to a rod 89 which is pivotally connected to a lever 90, one end of which is pivotally connected in turn to a stationary pin 91, and the other end to a piston 92 which is subject to the air pressure in the chamber 81 while being urged in the opposite direction by a spring 94.

A wedge shaped cam 95 fixed to the lever 90 bears against a follower block 97 which is applied against the cam by a spring 96.

It will be understood that normally the compressed air from the generator flows through the regulator between the unions 75 and 76. Whenever the pressure of this compressed air exceeds the limit determined by the tension of the spring 94, the piston 92 is shifted against the resistance of this spring and rocks the lever 90, whereby the needle valve 87 is lifted from its seat and communication is established between the union 75 and the outside atmosphere, the chamber 81 being then shut off from the outside atmosphere by the valve 82. By cooperating with the cam 95, the follower block 97 quickly breaks the balance when the lever 90 is rocked.

Thereafter, whenever the pressure prevailing in the chamber 81 returns to normal the regulator operates in the reverse direction and reestablishes communication between the ducts 77 and 78.

In Figure 5 is shown a form of distributor 39 wherein its body 100 communicates laterally through a union 101 with the upside portion of the pipe 31, and through a union 102 with the downside portion of the pipe 31, the direction of air flow being indicated by arrows; and one end of the body 100 is connected by a union 103 with the pipe 38, which is connected to the delivery side of the high pressure compressor; and the other end of the body is connected by a union 104 with the outside atmosphere.

The body 100 is formed with a cylindrical portion 105 which extends between the unions 103 and 101 and with a pair of annular seats 106 and 107, respectively, located on opposite sides of the inner end of the union or nipple 102. A valve 108 is slidably mounted in the cylindrical portion 105 and carries a gasket 109 having a convexity facing the union 103. This gasket is elastically applied by a washer 110 against the walls of the cylindrical portion 105.

The slide valve 108 is further provided with a disk valve 112 arranged to cooperate with the two seats 106 and 107. The valve 112 is urged toward the seat 106 by a weighted spring 114. When the high pressure compressor delivers air, the air pressure, acting upon the gasket 109 counterbalances the action of the spring 114 upon the slide valve 108, whereby the valve 112 is forced against the seat 107. The medium pressure air can then flow freely between the unions 101 and 102. However, when, because of the operation of the regulator 35 the high pressure compressor 3 discharges into the outside atmosphere, the pressure acting on the gasket 109 drops, whereupon the spring 114 shifts the slide valve 108 and engages the valve 112 with the seat 106, thereby shutting off the unions 101 and 102 from each other, while establishing communication between the union 102 and the high pressure compressor inlet and the outside atmosphere through the union 104.

In Figure 6 is shown a desirable form for the pressure relief device or pressure reducer 42, comprising a body or casing 120 communicating through a union 122 with the high pressure air inlet and through a union 123 with the outlet of the relief air. Both unions or nipples are in communication by means of a port 125 forming the seat of a shut off valve 126. A spring 127 urges the valve 126 toward the seat 125. The body 120 is provided on the side opposite the valve 126 with a cylindrical extension 130 the outer end of which communicates with the outside atmosphere through a hole 131. A sleeve 132 fitted with a gasket 132' seals the inner end of the extension 130 and is urged by a spring 133 toward the valve 126 which carries a headed stem 134 aligned with the sleeve. It will be understood that with this arrangement the valve 126 is normally held closed, and opens only when a push is exerted by the sleeve 132 upon the headed stem 134 as the air pressure prevailing in the union 133 drops below a predetermined level. The adjustment of the tension of the spring 133 may be under the control of a manometric cartridge.

It is advantageous, generally speaking, to maintain constant, regardless of the altitude of the aircraft, the absolute delivery pressure of the low pressure compressor; or, alternately, to cause said pressure to change with changes in altitude of the aircraft, in accordance with a fixed law.

For this purpose the arrangement shown in Figure 7 has a spring 7, associated with the valve 6 of the air purifier or scrubber, with which may be combined a closed manometric cartridge 143 containing air at atmospheric pressure, such as that obtaining at ground level. The expansion of the air in the cartridge 140 when the atmospheric pressure diminishes produces an increase in the tension of the spring 7, thereby compensating for the effect of altitude on the valve 6. Alternately, a vacuum may be used in the cartridge, in which case the cartridge would contain a spring 142 (see Figure 2) to distort it when the outside atmospheric air diminished in pressure due to the altitude of the aircraft.

In the embodiment of the invention shown in Figure 2, in which the low pressure compressor or generator 1 serves only for feeding the medium pressure or generator 2, the manometric cartridge controls a damper 144 movable in a casing connected to the suction pipe 1' of the low pressure compressor 1. The cartridge is enclosed in a tight casing 145 communicating with the delivery pipe 4 of the low pressure compressor. When the output of this compressor shows a tendency to increase in the casing 145, the resulting action of the cartridge 140 causes the intake of atmospheric air into the compressor to be throttled. Similarly, when the pressure in the casing 145 drops, the cartridge opens the damper 144 so as to permit an increase of air intake by the compressor 1. Because of this arrangement, the pressure at which the compressed air is delivered remains constant.

While I have described and shown herein preferred embodiments of my invention, it will be apparent to those skilled in the art that various changes and modification may be made therein without departing from the spirit and scope of my invention.

What I claim is:

1. In a system for the production of compressed air on aircraft, at least two compressed air generators, including a first generator and a second generator, a connection between the outlet of the first generator and the intake of the second generator to feed the second generator with air under greater than atmospheric pressure, the intake side of the first generator being open to the atmosphere, and manometric valving means arranged in the circuit of air flowing through the first generator in a manner to determine the pressure at which the second generator is fed in accordance with the altitude of the aircaft.

2. A system for the production of compressed air on aircraft, according to claim 1, wherein said connection includes an automatic valve having means connected to the output side of the second generator and arranged to automatically establish communication between the intake side of the second generator and the outside atmosphere while shutting off such communication with said first generator responsive to a drop in pressure of the output of the second generator.

3. In a system for the production of compressed air on aircraft, at least three compressed air generators, including low pressure, medium pressure, and high pressure generators, a connection between the outlet side of the low pressure generator and the intake side of the medium pressure generator to feed the medium pressure generator with air under greater than atmospheric pressure, the intake side of the low pressure generator being open to the atmosphere, manometrically controlled valving means in the circuit of air flowing in the low pressure generator and arranged to determine the pressure at which the medium pressure generator is supplied with air, a connection between the oulet side of the medium pressure generator and the intake side of the high pressure generator, and a service outlet on the last mentioned connection.

4. A system for the production of compressed air on aircraft, according to claim 3, wherein a reservoir is connected to the output of the high pressure generator for charging thereby, and wherein are comprised a pressure relief device, means connecting said device with the portion of the system to which the output of the medium pressure generator is suited, and with said reservoir, and a shut-off valve connected both in the connection feeding the high pressure generator and in the last mentioned connecting means, said shut-off valve being arranged to open one or the other of said connections.

5. In apparatus of the character described for supplying compressed air on board aircraft, the combination of, a first compressor means to deliver air to a first pressure system, a second compressor means to receive air from said first pressure system and deliver air at a higher pressure to a second pressure system, valve means to effect connection to and disconnection of the intake of said second compressor means from said first pressure system and to simultaneously control the connecting of the outlet of said second compressor means to the intake of said second compressor means, and means responsive to the pressure in said second pressure system to control the operation of said valve means.

6. Apparatus as described in claim 5 wherein said control means comprises, means constituting a valved connection between the outlet of said second compressor means and said second pressure system, means responsive to the pressure in said second pressure system to open the outlet of aid compressor means to the atmosphere, and means responsive to a drop in pressure at the outlet of said second compressor means to operate said valve means in a manner to disconnect the intake of said second compressor means from said first pressure system and simultaneously to establish communication between the outlet and the intake of said second compressor means.

7. Apparatus as described in claim 5 wherein pressure reducing means connects said second pressure system to said first pressure system.

8. In a system for the production of compressed air on aircraft having an engine comprising a carbureter and a supercharger therefor, said supercharger being connected at the output side of the carbureter and having an air intake open to the atmosphere, said supercharger constituting a first compressed air generator, at least one other compressed air generator, a supply connection between the output side of the first generator or supercharger and the intake side of the second generator, a manometrically controlled relief valve arranged in said supply connection so as to determine the supply pressure to the second generator in accordance with the altitude of the aircraft.

9. A plant for supplying compressed air to operate utilization means in aircraft or the like, said plant comprising at least two compressed air generators, a suction conduit connected to the intake of the first generator, a second conduit leading from the output side of the first generator to the intake of the second generator to supply said second generator with air at above atmospheric pressure, valving means arranged in said suction conduit for variably controlling the flow of air into the first generator, and control means for said valving means comprising a manometric capsule subject to the pressure prevailing in said conduit.

10. In a system for the production of compressed air on aircraft, at least two compressed air generators, including a first generator and a second generator, the intake side of the first generator being open to the atmosphere, a supply connection between the outlet side of the first generator and the intake side of the second generator, a manometrically controlled relief valve arranged in said supply connection so as to determine the supply pressure to the second generator in accordance with the altitude of the aircraft.

11. A system, according to claim 1, wherein said valving means includes resilient control means arranged to maintain the supply pressure to the second generator substantially constant in absolute value.

12. A system, according to claim 10, wherein said relief valve comprises elastic means urging the valve toward closed position and a manometric capsule arranged to adjust the tension of said elastic means in response to the atmospheric pressure at the altitude of flight.

13. In an installation for the production of compressed air on board aircraft or the like, a source of compressed air, a compressed air generator, an automatic distributor valve comprising a body, a conduit connecting said source of compressed air with a part of said body, another conduit connecting another part of said body with the intake of said generator whereby said generator can be supplied with air under greater than atmospheric pressure, a further conduit connecting another part of said body with the output of said generator, said body being provided with an opening to the atmosphere, and a spring loaded valve element in said body arranged to occupy either of two extreme positions in response to the output pressure of the generator, one of said positions establishing communication between the intake of the generator and with the atmosphere while shutting off communication between the intake of the generator and said source of compressed air, and the other position shutting off communication with the atmosphere while providing communication between the intake of the generator and said source of compressed air.

CHARLES RAYMOND WASEIGE.

REFERENCES CITED

The following references are of record in the file of this patent:

UNITED STATES PATENTS

| Number | Name | Date |
|---|---|---|
| 2,345,082 | Waseige | Mar. 28, 1944 |
| 1,041,529 | Troger | Oct. 15, 1912 |
| 1,987,666 | Carlson | Jan. 12, 1935 |
| 866,457 | Gibbs | Sept. 17, 1907 |
| 2,192,512 | Twiss | Mar. 5, 1940 |
| 2,168,669 | Ernst | Aug. 8, 1939 |

FOREIGN PATENTS

| Number | Country | Date |
|---|---|---|
| 415,560 | France | 1910 |